(12) United States Patent
Yen (10) Patent No.: US 12,092,946 B2
(45) Date of Patent: Sep. 17, 2024

(54) BASE FOR MOBILE SURVEILLANCE DEVICE

(71) Applicant: HUNG MING INFORMATION CO., LTD, Taichung (TW)

(72) Inventor: Chia Chun Yen, Taichung (TW)

(73) Assignee: HUNG MING INFORMATION CO., LTD., Taichung (TW)

( * ) Notice: Subject to any disclaimer, the term of this patent is extended or adjusted under 35 U.S.C. 154(b) by 127 days.

(21) Appl. No.: 18/054,564

(22) Filed: Nov. 11, 2022

(65) Prior Publication Data

US 2024/0126149 A1   Apr. 18, 2024

(30) Foreign Application Priority Data

Oct. 12, 2022   (TW) .................................. 111211121

(51) Int. Cl.
  *G03B 17/56*   (2021.01)
  *F16M 11/42*   (2006.01)
(52) U.S. Cl.
  CPC ........... *G03B 17/561* (2013.01); *F16M 11/42* (2013.01)

(58) Field of Classification Search
  CPC .............................. G03B 17/561; F16M 11/42
  See application file for complete search history.

(56) References Cited

U.S. PATENT DOCUMENTS

2021/0278751 A1* 9/2021 Christensen ......... F16M 13/022

* cited by examiner

*Primary Examiner* — Minh Q Phan
(74) *Attorney, Agent, or Firm* — Rosenberg, Klein & Lee (57) ABSTRACT

A base for a mobile surveillance device includes a base body having a room for receiving a battery and an equipment unit therein. Multiple first wheels are connected to the underside of the base body. A top assembly is located on a top of the base body and includes a first cover and a second cover. A ventilation zone is formed between the first and second covers. A fan is located in the ventilation zone so as to ventilate the room and the ventilation zone. A first tube has the first end thereof extending through the first and second covers, and is inserted into the room. A second tube is retractably inserted into the second end of the first tube and has cameras attached thereto. Multiple solar panels are connected to the top assembly to provide power to the battery and the cameras.

10 Claims, 10 Drawing Sheets

BASE FOR MOBILE SURVEILLANCE DEVICE

BACKGROUND OF THE INVENTION

1. Fields of the Invention

The present invention relates to a mobile surveillance device, and more particularly, to a base for a mobile surveillance device.

2. Descriptions of Related Art

Surveillance device is widely installed in various places such as traffic intersections, homes, businesses, buildings, offices and factories for preventing potential accidents or illegal events.

The current surveillance devices are installed at a fixed position, and the cameras of some of the surveillance devices are able to rotate for wider angle of view. However, these surveillance devices cannot move to meet specific purposes in desired positions. Therefore, it is necessary to develop a mobile surveillance device to provide necessary information effectively.

The present invention intends to provide a base for a mobile surveillance device to eliminate the shortcomings mentioned above.

SUMMARY OF THE INVENTION

The present invention relates to a base for a mobile surveillance device, and comprises a base body having a room formed therein. A battery and a control unit are located in the room. Multiple first wheels are connected to the underside of the base body. A top assembly is located on the top of the base body and includes a first cover and a second cover. The first cover is connected to the top of the base body. The second cover includes multiple separators on the underside thereof. The second cover is mounted to the first cover. The separators are located between the first and second covers so as to form a ventilation zone between the first and second covers. A fan is located in the ventilation zone to ventilate the room and the ventilation zone.

A first tube has the first end thereof extending through the first and second covers and inserted into the room. The second end of the first tube extends beyond the top assembly. A second tube is retractably inserted into the second end of the first tube.

Preferably, the base body is a triangular body and includes a first corner, a second corner and a third corner. The first tube is located at the first corner.

Preferably, a side board is formed between the second corner and the third corner. Multiple second wheels are connected to the side board.

Preferably, a handle is connected to outside of the first corner of the base body.

Preferably, a solar panel unit is connected to the top assembly which is electrically connected to the control unit.

Preferably, an expandable solar panel unit is connected to the top assembly and pivotably connected to the first tube. The expandable solar panel unit includes multiple solar panels which are electrically connected to the control unit and pivotable relative to the first tube.

Preferably, the multiple solar panels includes a first solar panel and two second solar panels. The first solar panel is connected to the top assembly. The two second solar panels are respectively have a pivotal portion which is pivotably mounted to the first tube. Each of the pivotal portions has a stop.

The primary object of the present invention is to provide a base for a mobile surveillance device which has high mobility so as to be easily set at desired positions.

Another object of the present invention is to provide a base for a mobile surveillance device wherein the base includes a ventilation zone with a fan to remove heat generated from the battery and the control unit.

Yet another object of the present invention is to provide a base for a mobile surveillance device wherein the power for the battery, the cameras and the control unit can be provided by the solar panel unit.

The advantages of the present invention are that the surveillance device can be easily carried from one place to another by using the handle and the second wheels. The position of the base body can be adjusted by the first wheels.

The top assembly avoids rain from entering into the battery and the control unit. The solar panels absorb the heat of the sun light. The fan installed to the top assembly remove the heat in the room and delivers the heat from the ventilation zone to reduce temperature in the room.

The power of the surveillance device is provided by the solar panels so that the surveillance device can be used without the need of the city power. The solar panels can be expanded and folded for convenience of storage and transportation.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
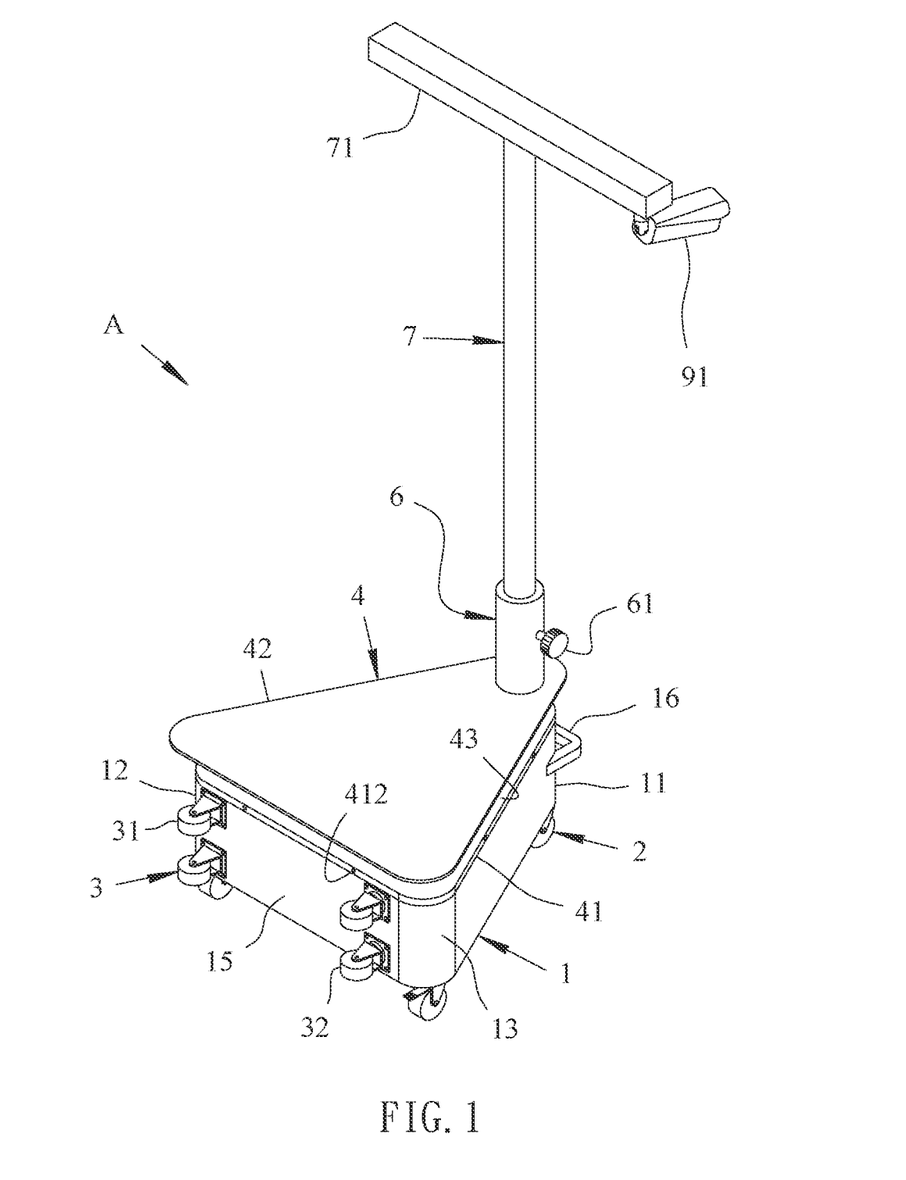
FIG. 1 is a perspective view to show the mobile surveillance device of the present invention.
Figure 2:
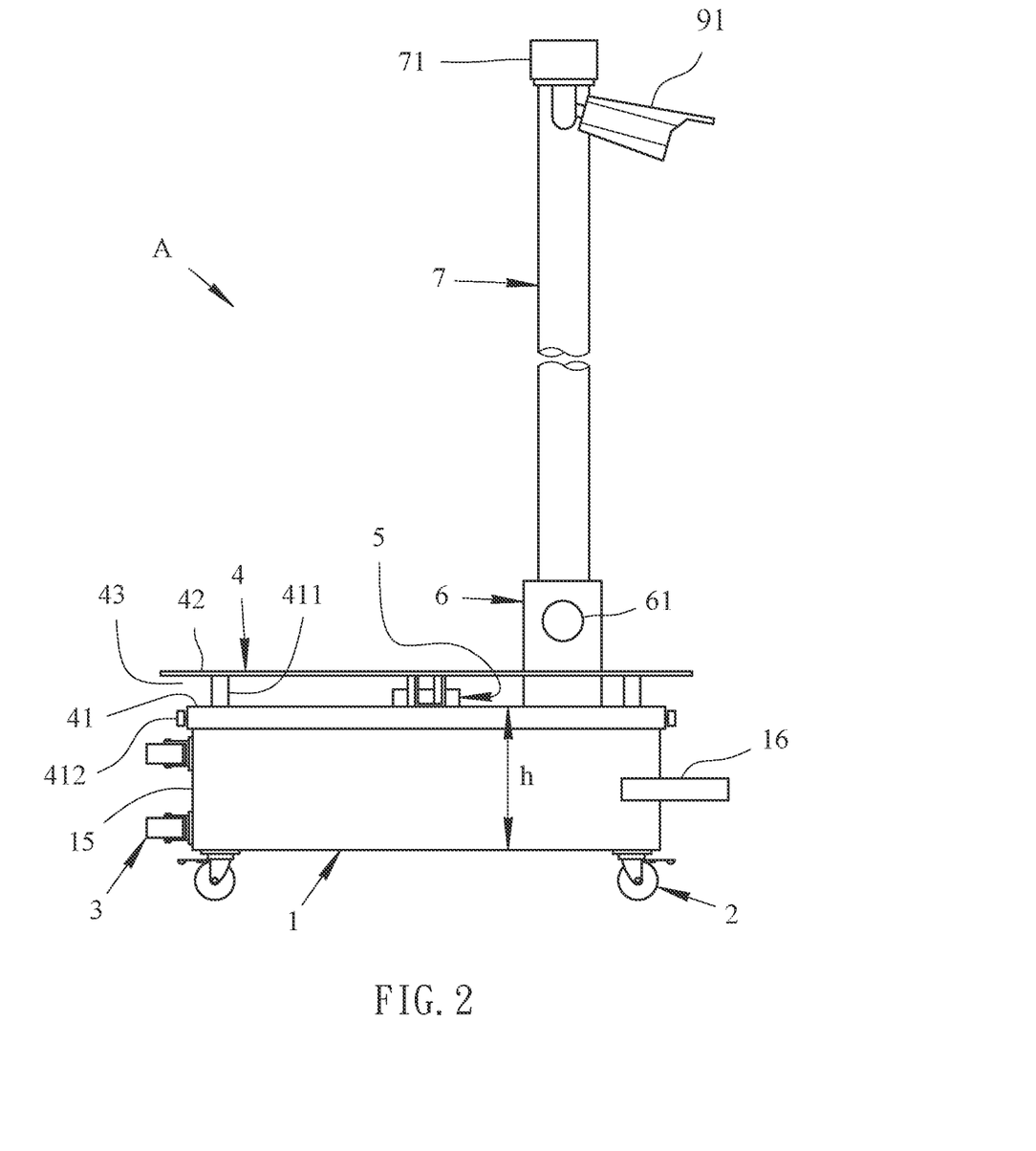
FIG. 2 is a side view to show the mobile surveillance device of the present invention.
Figure 3:
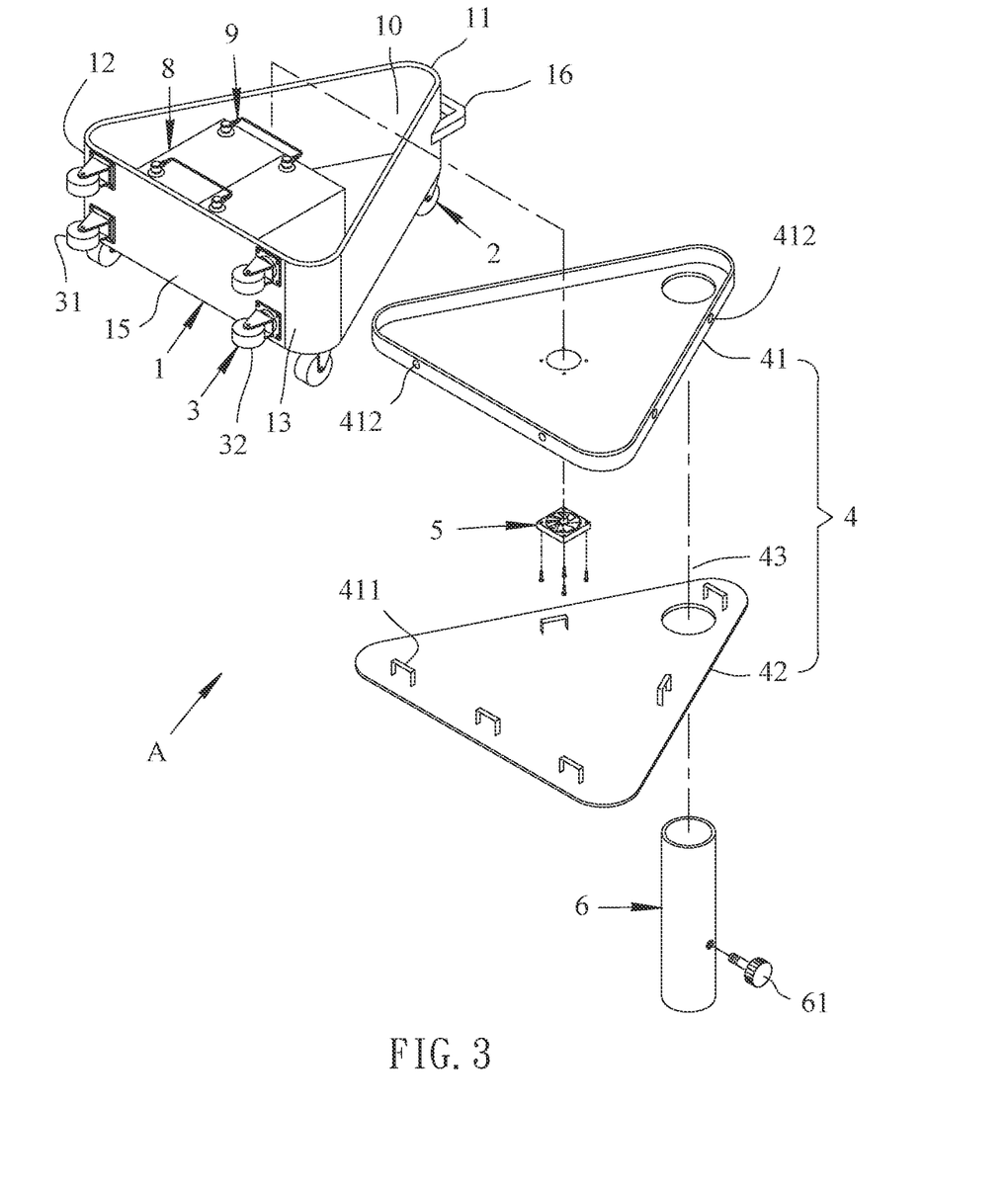
FIG. 3 is an exploded view of the base of the mobile surveillance device of the present invention.

Referring to FIGS. 1 to 3, the base for a mobile surveillance device "A" comprises a base body 1, multiple first wheels 2, multiple second wheels 3, a top assembly 4, a fan 5, a first tube 6 and multiple solar panels.

The base body 1 includes a room 10 formed therein, and multiple batteries 8 and a control unit 9 are located in the room 10. The control unit 9 includes a circuit board, a charging part, an electric power adaptor, a power cable and a control cable. Heat will be generated during operation of the batteries 8 and the control unit 9. The base body 1 is made of metal boards.

The base body 1 is a triangular body and includes a first corner 11, a second corner 12 and a third corner 13. A handle 16 is connected to outside of the first corner 11 of the base body 1.

Figure 4:
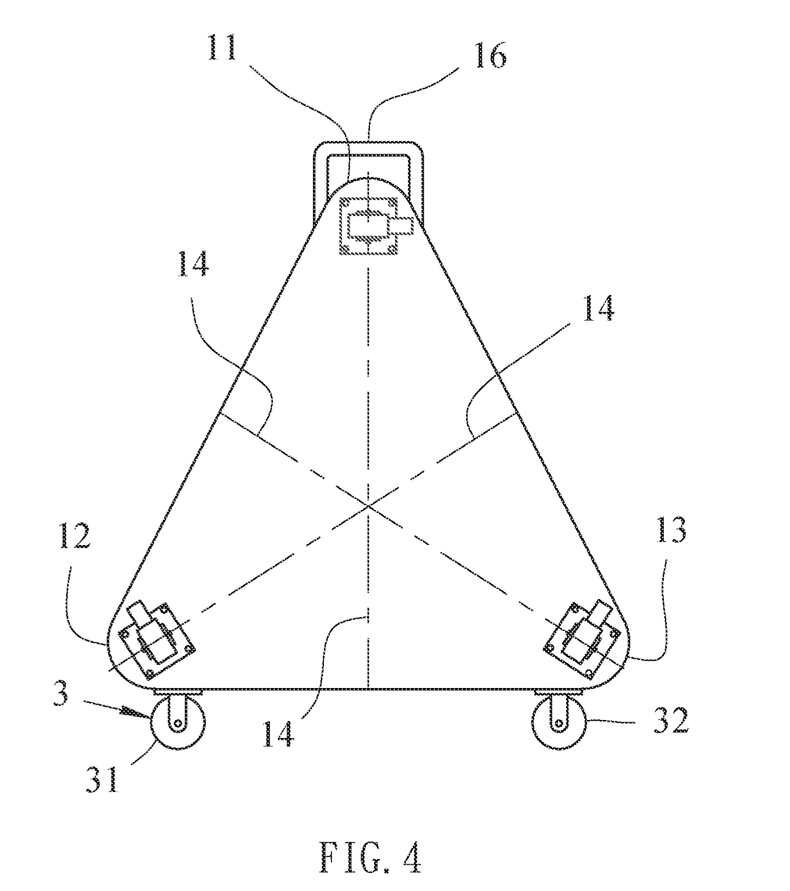
FIG. 4 shows a bottom view of the base body, the first wheels are respectively perpendicular to three respective angle bisectors of the first corner, the second corner and the third corner.

As shown in FIG. 4, the multiple first wheels 2 are connected to the underside of the base body 1. Preferably, the first wheels 3 include three brake wheels which are respectively perpendicular to three respective angle bisectors 14 of the first corner 11, the second corner 12 and the third corner 13.

Figure 6:
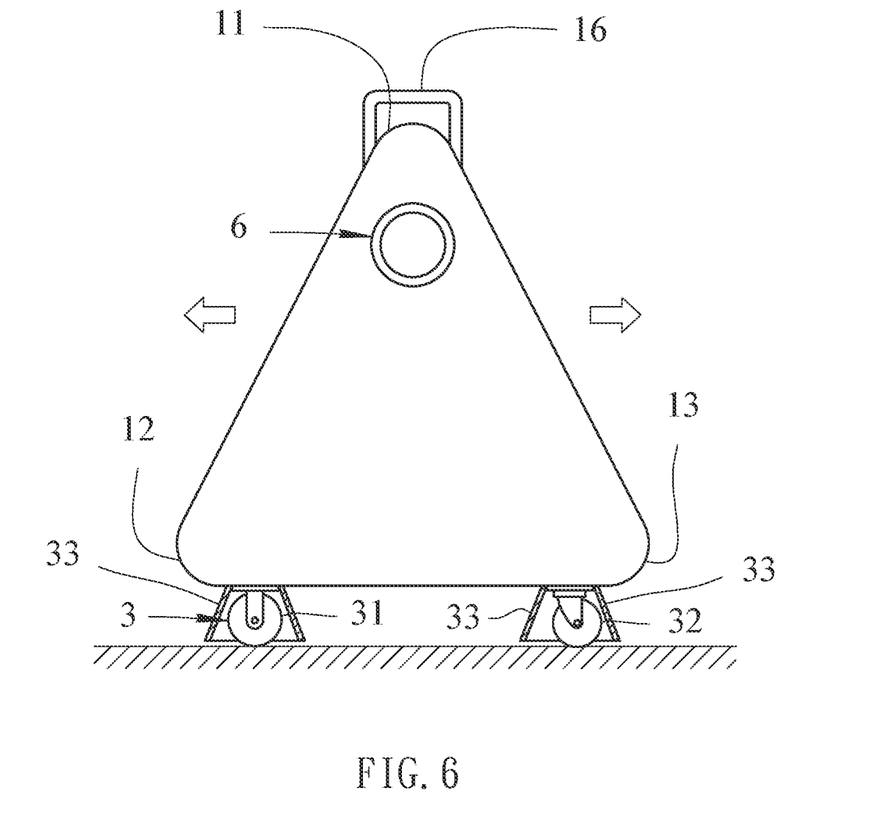
FIG. 6 shows that the base body is movable by the second wheels.

A side board 15 is formed between the second corner 12 and the third corner 13. The multiple second wheels 3 are connected to the side board 15. The second wheels 3 include two directional wheels 31 and two universe-direction wheels 32. Each of the second wheels 3 includes a housing 33 connected thereto as shown in FIG. 6 to avoid the second wheels 3 from hitting pedestrians.

Figure 5:
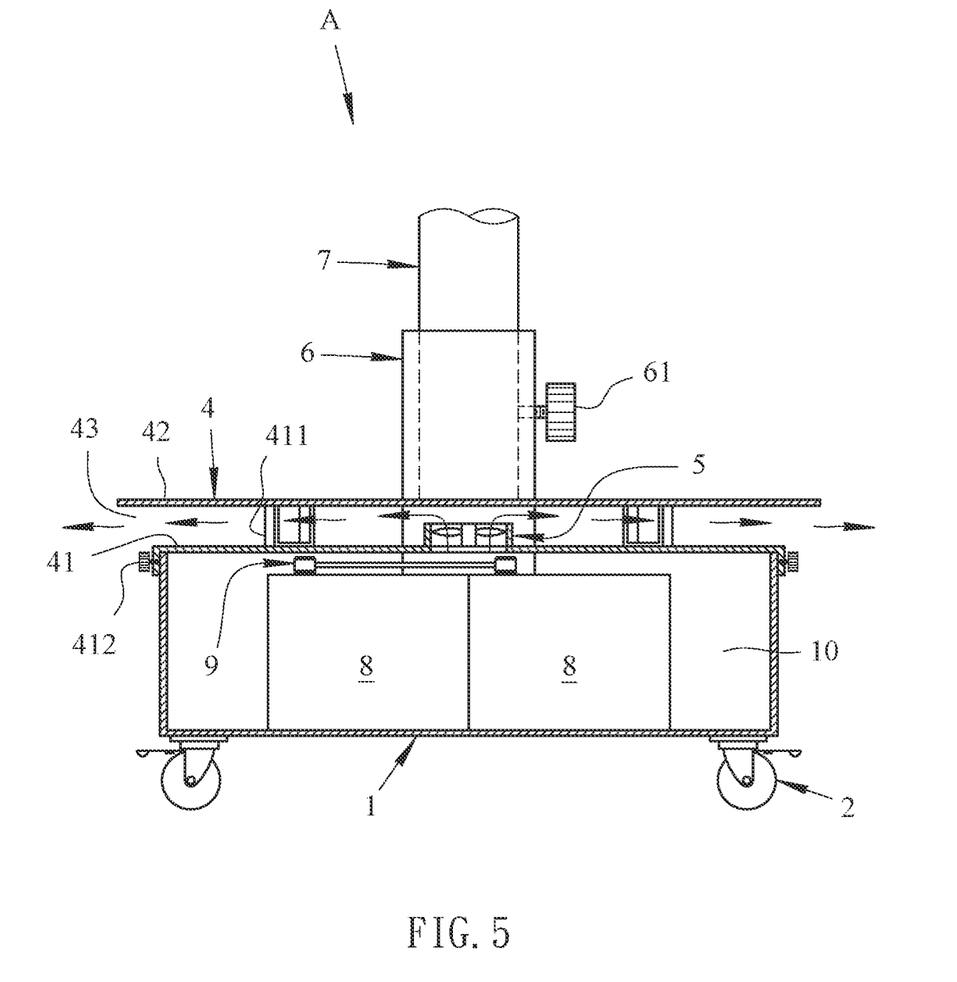
FIG. 5 is a cross sectional view to show the base body of the mobile surveillance device of the present invention.

As shown in FIGS. 3 and 5, the top assembly 4 is shaped corresponding to the base body 1 and is located on the top of the base body 1. The top assembly 4 includes a first cover 41 and a second cover 42, wherein the first cover 41 is connected to the top of the base body 1. The second cover 42 includes multiple separators 411 on the underside thereof. The second cover 42 is mounted to the first cover 41, so that the separators 411 are located between the first and second covers 41, 42. A ventilation zone 43 is formed between the first and second covers 41, 42. A fan 5 is connected to the first cover 41 and located in the ventilation zone 43 so as to ventilate the room 10 and the ventilation zone 43, such that the heat mentioned above can be removed from the room 10. The first cover 41 includes multiple holes 412 formed to three sides thereof. The first cover 41 is secured to the top of the base body 1 by bolts (not shown) extending through the holes 412.

The fan 5 is electrically connected to the control unit 9 as shown in FIGS. 3 and 5, and is located between the first cover 41 and the second cover 42 to bring cool air through the ventilation zone 43 to remove the heat generated from the batteries 8 and the control unit 9.

As shown in FIGS. 2 and 5, the first end of the first tube 6 extends through the first and second covers 41, 42 and is inserted into the room 10. The second end of the first tube 6 extends beyond the top assembly 4. The first tube 6 is located at the first corner 11. A second tube 7 is retractably inserted into the second end of the first tube 6. A locking member 61 extends through the first tube 6 and secures the first tube 6 to the second tube 7. A transverse bar 71 is connected to the top end of the second tube 7 and a camera 91 is attached to the transverse bar 71.

Figure 7:
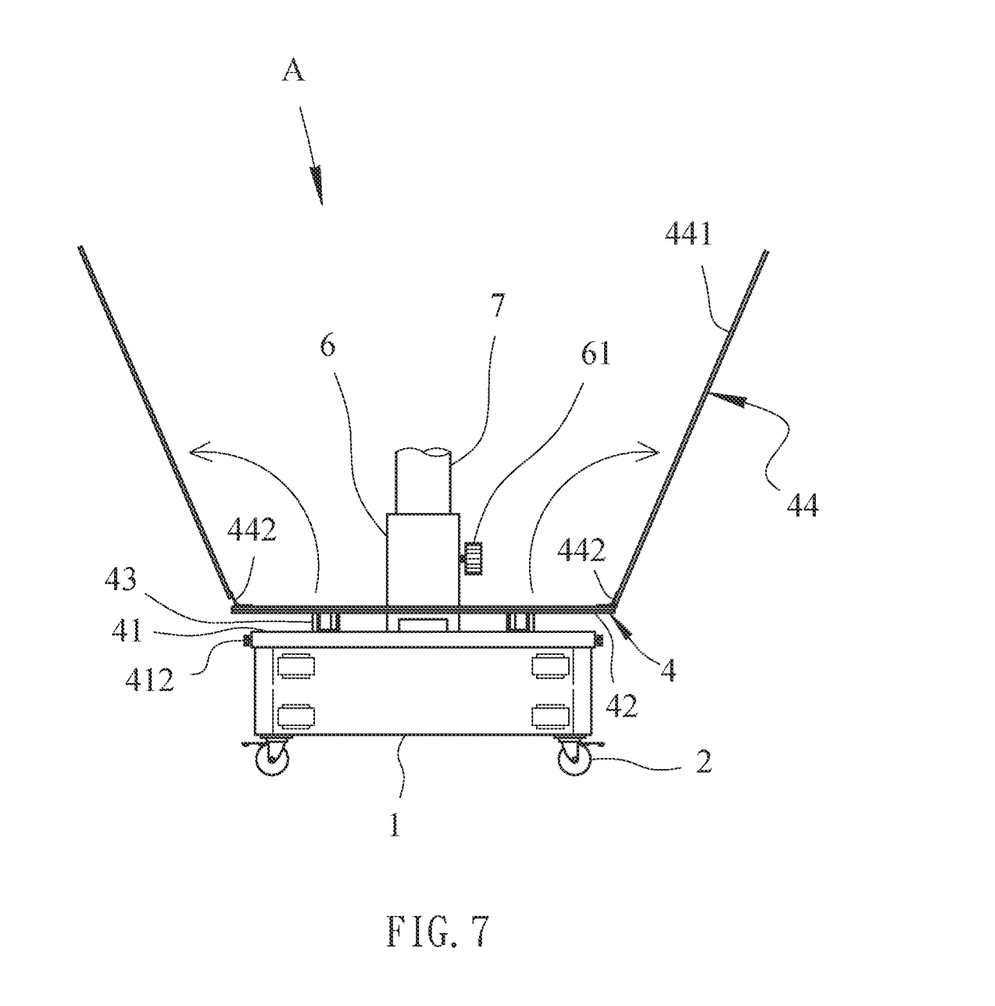
FIG. 7 shows that the mobile surveillance device of the present invention has foldable solar panels.
Figure 8:
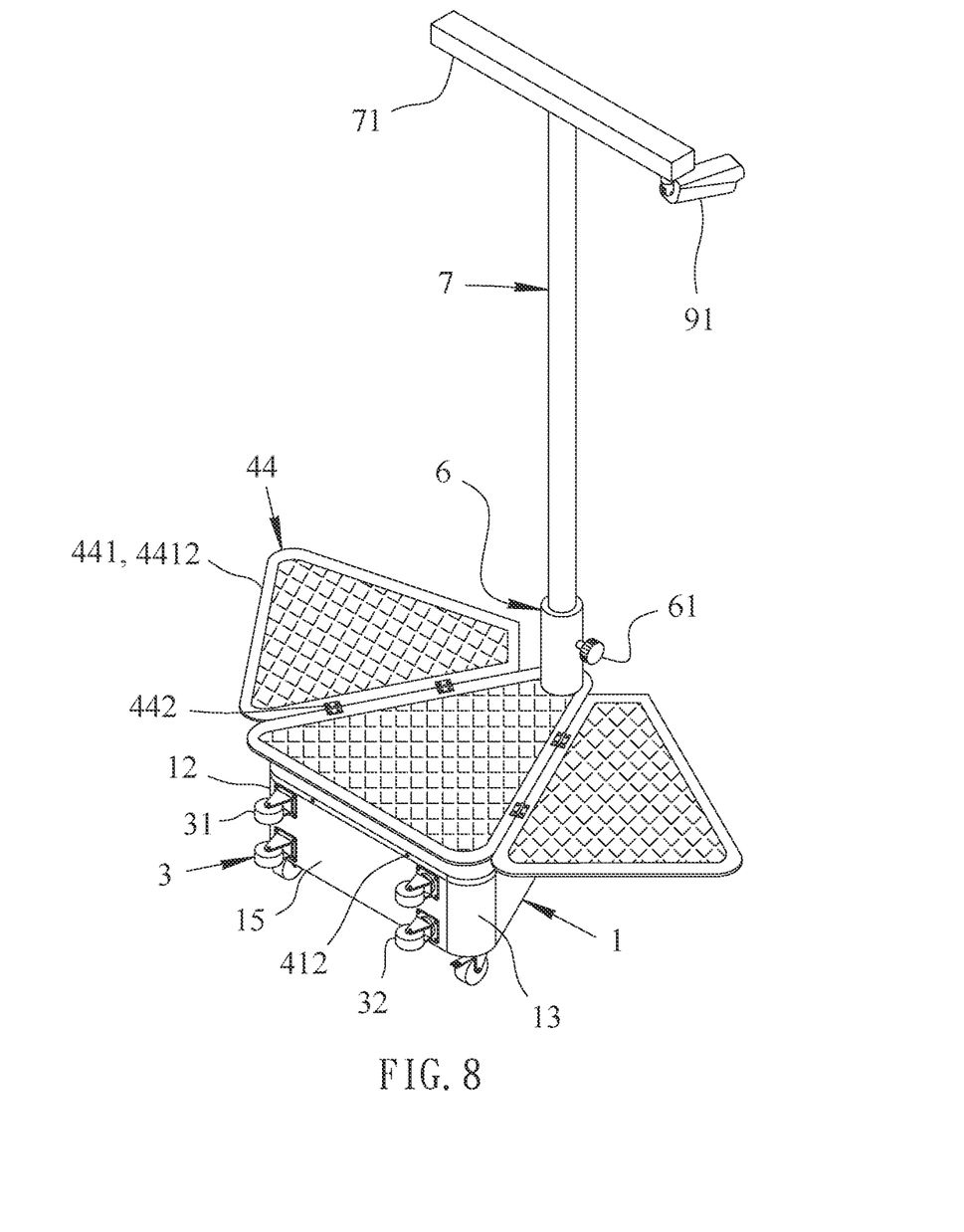
FIG. 8 is a perspective view to show that the mobile surveillance device of the present invention with the foldable solar panels.

A solar panel unit 44 as shown in FIGS. 7 and 8 is connected to the top assembly 4 and the solar panel unit 44 is electrically connected to the control unit 9. The solar panel unit 44 is composed of multiple solar panels 441 connected with each other by multiple hinges 442. The solar panel unit 44 is located on the top of the top assembly 4. The multiple solar panels 441 are folded to form a triangle shape assembly which is shaped as the base body 1. Each solar panel 441 includes multiple photons collected on a board and a frame 4412 enclosed to the board. When the solar panels 441 expand, the solar energy is transformed into electrical energy to charge the batteries 8 so that the mobile surveillance device "A" of the present invention does not city power.

Figure 9:
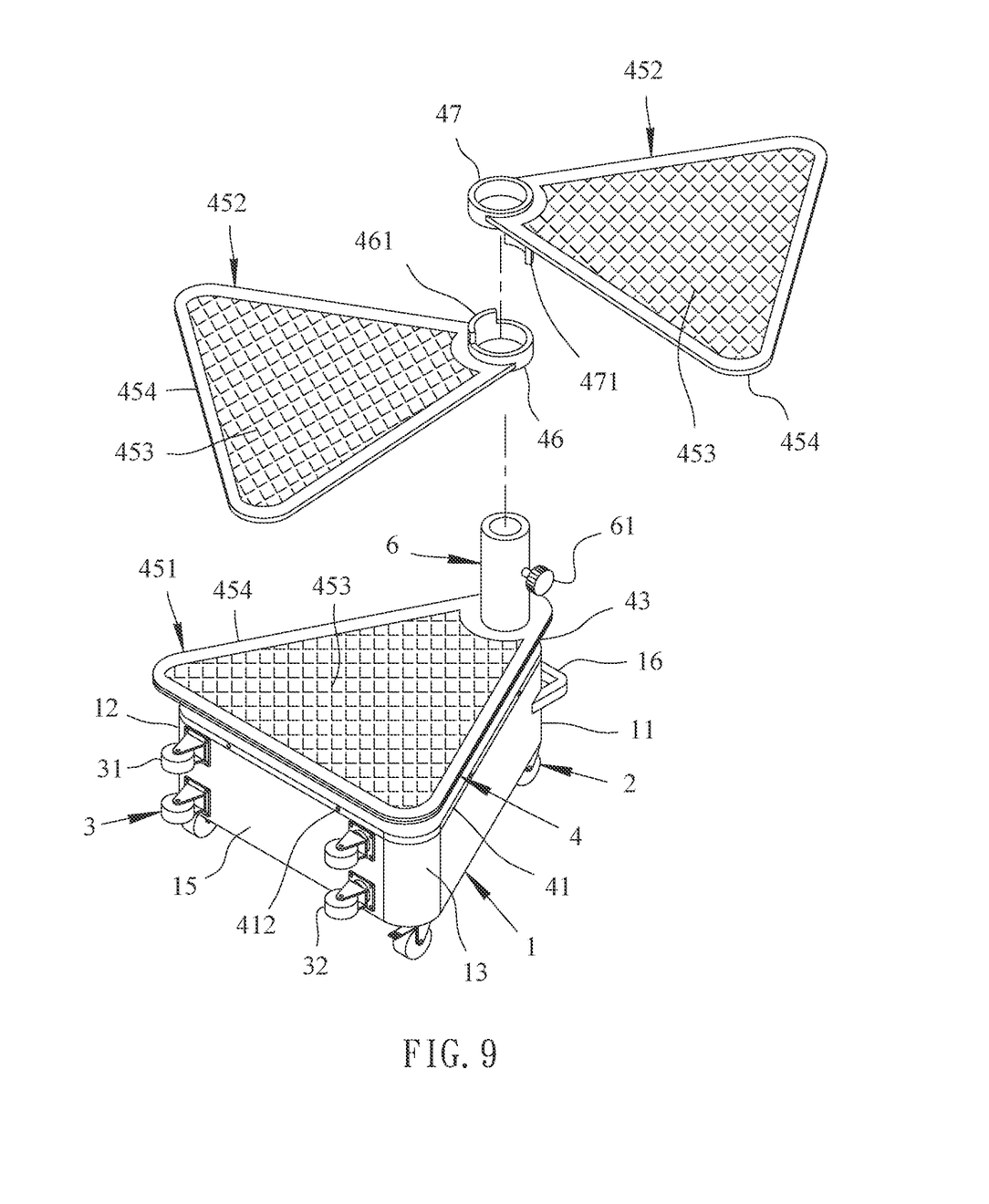
FIG. 9 shows that the mobile surveillance device of the present invention with pivotable solar panels.
Figure 10:
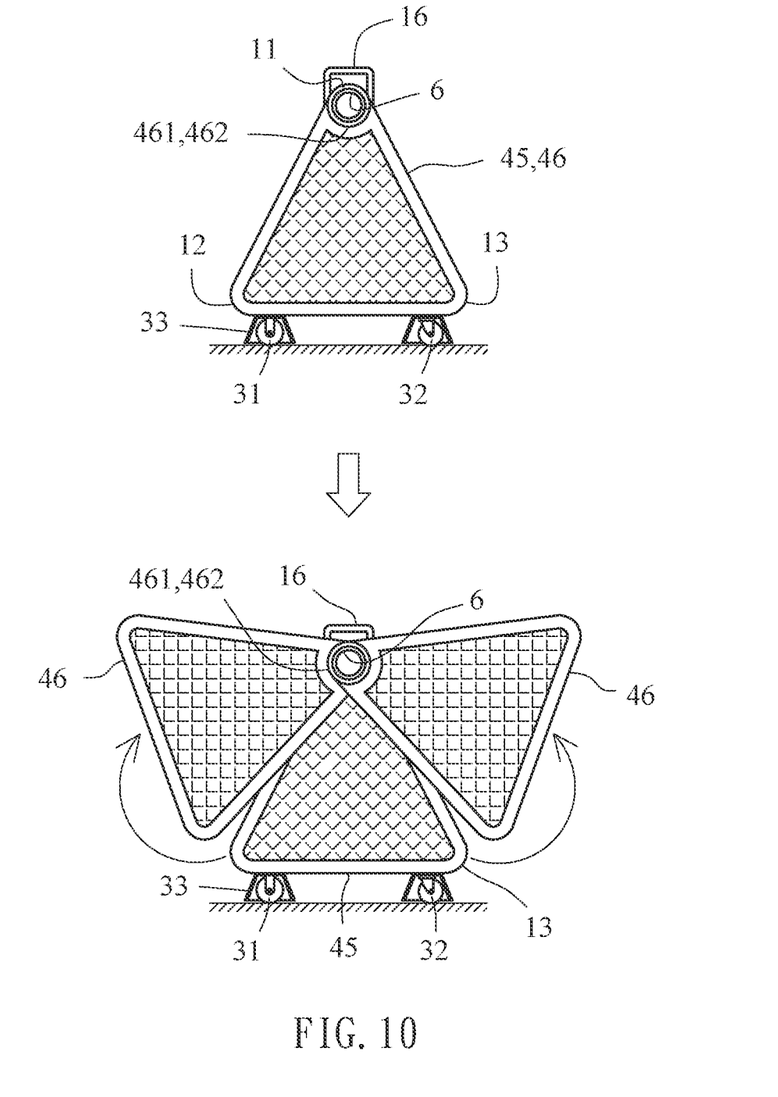
FIG. 10 shows the operation of the pivotable solar panels disclosed in FIG. 9.

As shown in FIGS. 9 and 10, another embodiment of the present invention shows that an expandable solar panel unit 45 is connected to the top assembly 4 and includes a first solar panel 451 and two second solar panels 452. The first solar panel 451 is connected to the top assembly 4, and the two second solar panels 452 respectively have a pivotal portion 46/47 which is pivotably mounted to the first tube 6, so that the first and second solar panels 451, 452 can be pivoted relative to the first tube 6. Each of the pivotal portions 46, 47 has a stop 461/471. Each of the first and second solar panels 451, 452 includes multiple photons 453 collected on a board and a frame 454 enclosed to the board. The first and second stops 461, 471 position the two second solar panels 452 at a desired angle. When the first and second solar panels 451, 452 expand, the solar energy is transformed into electrical energy to charge the batteries 8 so that the surveillance device of the present invention does not city power. When not in use, the first and second solar panels 451, 452 are folded to form a triangle shape assembly which is shaped as the base body 1.

As shown in FIGS. 4 and 6, the base body 1 can be positioned such that the second wheels 3 contact the ground. The base body 1 can be easily carried by holding the handle 16 and move the mobile surveillance device "A" of the present invention from place to another. The users decide whether the base body 1 stands on the first wheels 2 or the second wheels 3. The power cable and the control cable can be pulled via the second tube 7 and are connected to the camera 91.

When the mobile surveillance device "A" of the present invention is set at a desired position, the users move the base body 1 by releasing the first wheels 2 so that the range of surveillance of the camera 91 can be adjusted. After the range of surveillance of the camera 91 is set, the first wheels 2 which are the brake wheels are locked.

The top assembly 4 avoids rain from entering into the batteries 8 and the control unit 9. The solar panels absorb the heat of the sun light. The fan 5 as shown in FIG. 5 installed to the top assembly 4 removes the heat in the room 10 and delivers the heat from the ventilation zone 43 to reduce temperature in the room 10.

While we have shown and described the embodiment in accordance with the present invention, it should be clear to those skilled in the art that further embodiments may be made without departing from the scope of the present invention.

What is claimed is:

1. A base for a mobile surveillance device, comprising:

a base body having a room formed therein, a battery and a control unit located in the room, multiple first wheels connected to an underside of the base body;

a top assembly located on a top of the base body and including a first cover and a second cover, the first cover connected to the top of the base body, the second cover including multiple separators on an underside thereof, the second cover mounted to the first cover, the separators located between the first and second covers, a ventilation zone between the first and second covers, a fan located in the ventilation zone so as to ventilate the room and the ventilation zone, and a first tube having a first end thereof extending through the first and second covers and inserted into the room, a second end of the first tube extending beyond the top assembly, a second tube retractably inserted into the second end of the first tube.

2. The base for a mobile surveillance device as claimed in claim 1, wherein the base body is a triangular body and includes a first corner, a second corner and a third corner, the first tube is located at the first corner.

3. The base for a mobile surveillance device as claimed in claim 2, wherein a side board is formed between the second corner and the third corner, multiple second wheels are connected to the side board.

4. The base for a mobile surveillance device as claimed in claim 3, wherein the first wheels include three brake wheels which are respectively perpendicular to three respective angle bisectors of the first corner, the second corner and the third corner.

5. The base for a mobile surveillance device as claimed in claim 2, wherein a handle is connected to outside of the first corner of the base body.

6. The base for a mobile surveillance device as claimed in claim 2, wherein each of the second wheels includes a housing connected thereto, the second wheels include two directional wheels and two universe-direction wheels.

7. The base for a mobile surveillance device as claimed in claim 1, wherein the first cover includes multiple holes formed to three sides thereof, a locking member extends through the first tube.

8. The base for a mobile surveillance device as claimed in claim 1, wherein a solar panel unit is connected to the top assembly which is electrically connected to the control unit.

9. The base for a mobile surveillance device as claimed in claim 1, wherein an expandable solar panel unit is connected to the top assembly and pivotably connected to the first tube, the expandable solar panel unit includes multiple solar panels which are electrically connected to the control unit and pivotable relative to the first tube.

10. The base for a mobile surveillance device as claimed in claim 9, wherein the multiple solar panels includes a first solar panel and two second solar panels, the first solar panel is connected to the top assembly, the two second solar panels respectively have a pivotal portion which is pivotably mounted to the first tube, each of the pivotal portions has a stop.

\* \* \* \* \*